(12) United States Patent
Tonkin (10) Patent No.: US 12,470,015 B2
(45) Date of Patent: Nov. 11, 2025

(54) ARC FLASH PROTECTION SYSTEMS AND METHODS (71) Applicant: Phillips & Temro Industries Inc., Eden Prairie, MN (US)

(72) Inventor: Steven W. Tonkin, Eden Prairie, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 607 days.

(21) Appl. No.: 17/967,127

(22) Filed: Oct. 17, 2022

(65) Prior Publication Data

US 2024/0128680 A1   Apr. 18, 2024

(51) Int. Cl.
*H02H 3/00* (2006.01)
*H01R 13/53* (2006.01)
*H01R 13/713* (2006.01)
*H02H 3/33* (2006.01)

(52) U.S. Cl.
CPC ......... *H01R 13/53* (2013.01); *H01R 13/7135* (2013.01); *H02H 3/33* (2013.01)

(58) Field of Classification Search
CPC ................ H01R 13/7135; H01R 13/53; H02H 1/10015; H02H 3/33; H02H 3/16
See application file for complete search history.

(56) References Cited

U.S. PATENT DOCUMENTS

| | | | | |
|---|---|---|---|---|
| 11,646,580 B2 * | 5/2023 | Apostolov | ............. | G01R 31/52 |
| | | | | 700/297 |
| 11,650,242 B2 * | 5/2023 | Chen | ...................... | H01J 35/02 |
| | | | | 324/551 |
| 11,698,403 B2 * | 7/2023 | Schroeder | ................ | H02H 7/26 |
| | | | | 361/78 |
| 11,874,302 B2 * | 1/2024 | Wu | ..................... | G01R 13/0245 |
| 2004/0136125 A1 | 7/2004 | Nemir et al. | | |
| 2005/0134285 A1 | 6/2005 | Mernyk et al. | | |
| 2019/0386479 A1 | 12/2019 | Packard | | |
| 2022/0021195 A1 | 1/2022 | Rathi et al. | | |

* cited by examiner

*Primary Examiner* — Phuong Chi Thi Nguyen
(74) *Attorney, Agent, or Firm* — Harness, Dickey & Pierce, P.L.C.

(57) ABSTRACT

An arc flash protection system includes: an arc flash detection module electrically connected directly to a cord coupled to an electrical load and electrically connected to a ground fault circuit interrupt (GFCI) outlet, the arc flash detection module configured to: measure at least one of voltage and current of the cord; and based on the at least one of the voltage and the current of the cord, determine and indicate whether an arc flash condition is present; and a GFCI triggering module configured to, in response to the arc flash detection module indicating that an arc flash condition is present, output a predetermined current to a ground conductor of the cord.

20 Claims, 5 Drawing Sheets

ARC FLASH PROTECTION SYSTEMS AND METHODS

FIELD

The present disclosure relates to electrical cords and more specifically to arc flash protection systems and methods of electrical cords.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various types of electrical wall outlets are available. For example, 125 volt duplex outlets are available in various different current ratings. Wall outlets are also available in other voltages, such as 250 volts.

Another type of electrical wall outlet is ground fault circuit interrupt (GFCI) outlets. GFCI outlets may be required to satisfy one or more regulatory requirements, such as for electrical outlets that are exposed to outdoor conditions or within a predetermined distance of water.

SUMMARY

In a feature, an arc flash protection system includes: an arc flash detection module electrically connected directly to a cord coupled to an electrical load and electrically connected to a ground fault circuit interrupt (GFCI) outlet, the arc flash detection module configured to: measure at least one of voltage and current of the cord; and based on the at least one of the voltage and the current of the cord, determine and indicate whether an arc flash condition is present; and a GFCI triggering module configured to, in response to the arc flash detection module indicating that an arc flash condition is present, output a predetermined current to a ground conductor of the cord.

In further features, the arc flash detection module is configured to measure the voltage of the cord.

In further features, the arc flash detection module is configured to measure the current of the cord.

In further features, the arc flash detection module is configured to determine and indicate whether an arc flash condition is present based on a frequency of the at least one of the voltage and the current.

In further features, the arc flash detection module is configured to determine and indicate that an arc flash condition is present when the frequency is greater than a predetermined frequency.

In further features, the predetermined frequency is greater than 60 Hertz.

In further features, the arc flash detection module is configured to determine and indicate that an arc flash condition is present when the frequency is greater than the predetermined frequency for greater than a predetermined period.

In further features, a circuit board is included, and the arc flash detection module and the GFCI triggering module are disposed on the circuit board.

In further features, over molding material molds the circuit board, the arc flash detection module, and the GFCI module onto the cord.

In further features, weatherproofing material is included.

In further features, insulation displacement connectors electrically connect the arc flash detection module and the GFCI module to the ground conductor and at least one other electrical conductor of the cord.

In further features, the GFCI outlet is included, where the GFCI outlet includes a GFCI module configured to selectively electrically disconnect electrical conductors of one or more outlets of the GFCI outlet from incoming alternating current (AC) power.

In further features, the GFCI module is configured to electrically disconnect the electrical conductors of the one or more outlets from the incoming AC power in response to detection of a current difference between hot and neutral conductors of at least a second predetermined current.

In further features, the second predetermined current is less than the predetermined current.

In further features: the electrical load is a three-phase load; the arc flash detection module is electrically connected directly to three power wires of the cord; and the GFCI triggering module is configured to output the predetermined current to the ground conductor of the cord.

In a feature, a method includes: measuring at least one of a voltage and current of a cord, the cord coupled to an electrical load and electrically connected to a ground fault circuit interrupt (GFCI) outlet; based on the at least one of the voltage and the current of the cord, determining and indicating whether an arc flash condition is present; and in response to the indication that an arc flash condition is present, outputting a predetermined current to a ground conductor of the cord.

In further features, the method further includes measuring the voltage of the cord.

In further features, the method further includes measuring the current of the cord.

In further features, the method further includes determining and indicating whether an arc flash condition is present based on a frequency of the at least one of the voltage and the current.

In further features, the method further includes determining and indicating that an arc flash condition is present when the frequency is greater than a predetermined frequency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Arc flash electrical wall outlets are expensive. Not only do arc flash outlets include costly arc flash sensing circuitry, but arc flash outlets also include a relatively large electrical relay that is configured to achieve the full current rating of the outlet.

The present application involves an electrical cord that includes an arc flash detection module and a GFCI triggering module. The arc flash detection module is configured to detect an arc flash. Instead of disconnecting a relay as in an arc flash outlet, however, the GFCI triggering module injects a predetermined current into a ground wire of the cord from the neutral or hot power wire. The injection of the predetermined current to the ground wire of the cord causes a GFCI outlet to which the cord is electrically connected to trip and open circuit because of the current imbalance between hot and neutral wires of the cord. The arc flash detection module and the GFCI triggering module provide protection when an arc flash condition occurs.

Figure 1:
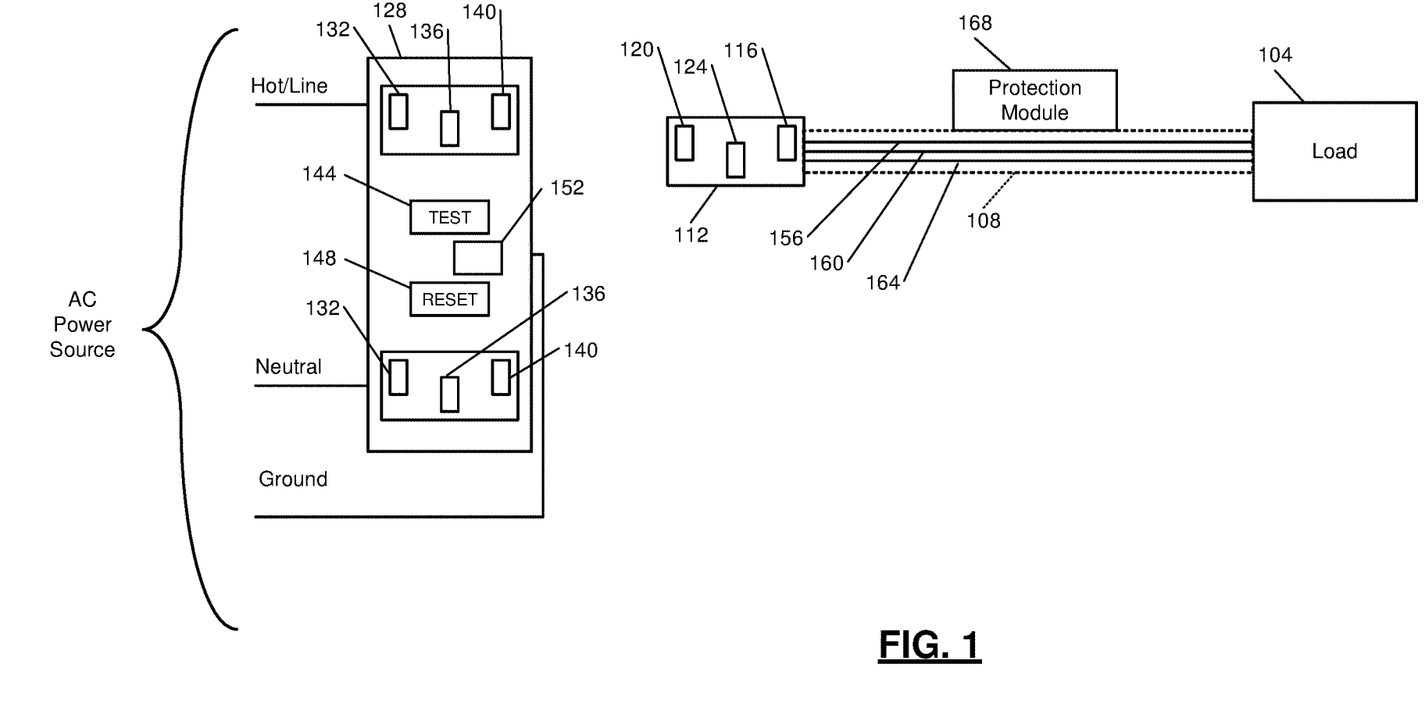
FIGS. 1 and 2 are functional block diagrams of example arc flash protection systems.

FIG. 1 is a functional block diagram of an example arc flash protection system.

An electrical device includes an electrical load 104 that is configured to receive alternating current (AC) power via a cord 108 and a plug 112. The electrical load 104 may be, for example, an electric (e.g., resistive) heater, one or more electric motors, or another suitable electrical load. The plug 112 is a three wire AC plug. The plug 112 includes first, second, and third electrical conductors (e.g., male type) 116, 120, and 124.

Figure 2:
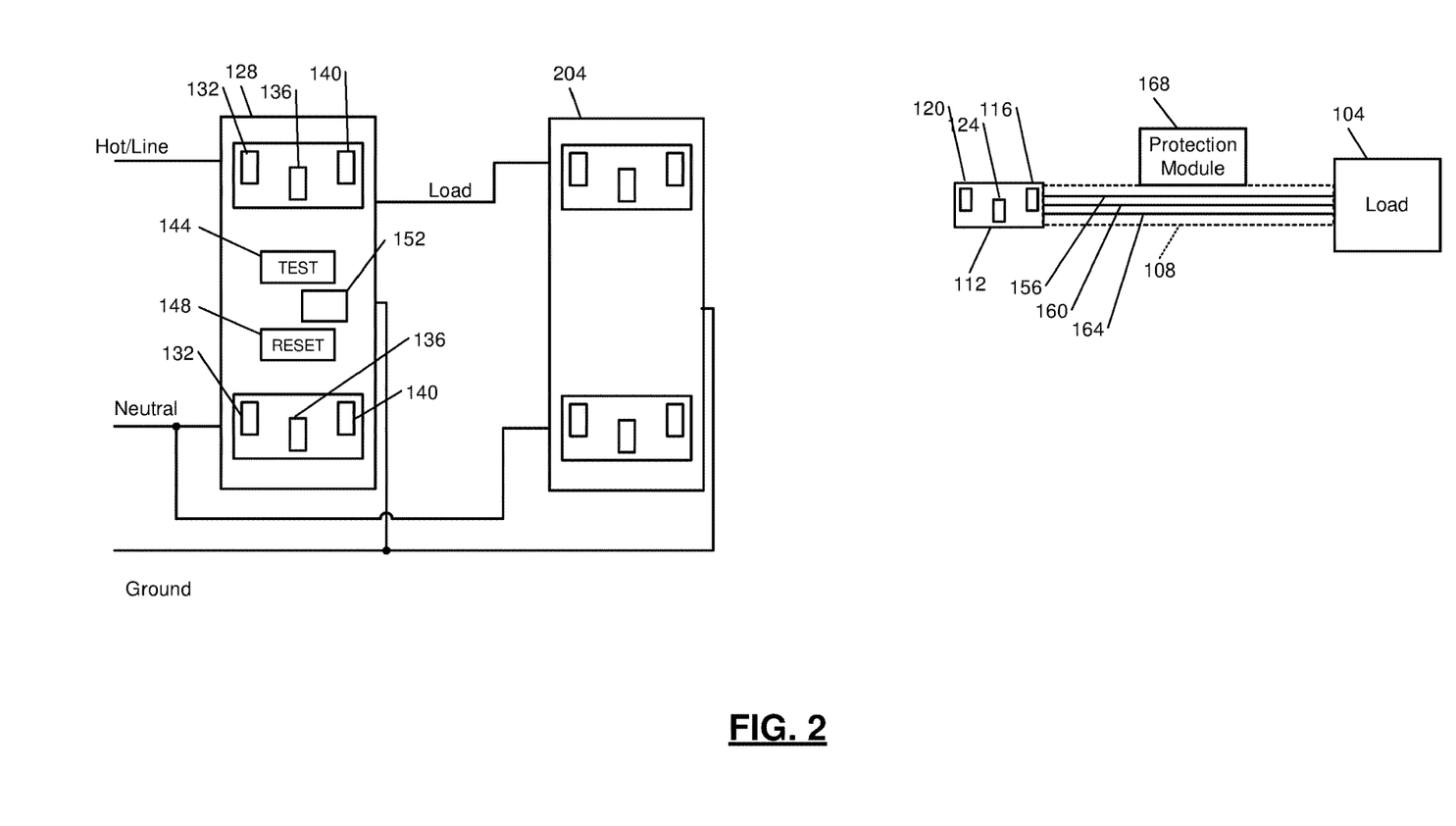

The plug 112 is configured to mate with AC wall outlets, such as outlet 128. The electrical conductors 116, 120, and 124 electrically connect to electrical conductors (e.g., female type) such as 132, 136, and 140 of the outlet 128. In the example of FIG. 1, the outlet 128 is a ground fault circuit interrupt (GFCI) outlet. The plug 112, however, is also configured to mate with standard (non GFCI) outlets that are electrically connected in series with one or more GFCI outlets, such as illustrated in the example of FIG. 2 where outlet 204 is a non GFCI outlet. Duplex outlets include two sets of the electrical conductors 132, 136, and 140.

The outlet 128 is connected to an AC power source, such as a 120 V AC power source via a hot/line wire, a neutral wire, and a ground wire. The ground wire may be omitted or connected with the neutral wire in various implementations. The outlet 128 includes a switch (not shown) that connects and disconnects the AC power source to and from the electrical conductors 132, 136, 140. For example, the switch may connect the AC power source with the electrical conductors 132, 136, and 140 when a test button/switch 144 is actuated. The switch may disconnect the AC power source from the electrical conductors 132, 136, and 140 when a reset button/switch 148 is actuated. When the AC power source is disconnected from the electrical conductors 132, 136, and 140, actuation (e.g., depression) of the test button/switch 144 may be needed to electrically connect the AC power source to the electrical conductors 132, 136, and 140.

The outlet 128 also includes a GFCI module 152. The GFCI module 152 detects ground fault conditions and disconnects the AC power source from the electrical conductors 132, 136, and 140 when a ground fault condition is detected. This is similar to the actuation of the reset button/switch 148. The GFCI module 152 may detect the presence of a ground fault condition, for example, when a predetermined current imbalance (difference) is present between the hot/line conductor and the neutral conductor. For example, the GFCI module 152 may detect the presence of a ground fault condition when a difference between (a) a current through the neutral conductor and (b) a current through the hot/line conductor is greater than a first predetermined current. The first predetermined current may be calibrated and may be, for example, 5 milliamps (mA) or another suitable current. The magnitude of the current through the neutral conductor should be the same as the current through the hot/line conductor when a ground fault condition is not present.

The cord 108 includes a hot/line electrical conductor (wire) 156, a neutral electrical conductor (wire) 160, and a ground electrical conductor (wire) 164. The hot and neutral electrical conductors 156 and 160 may be surrounded by electrical insulators/isolators. The cord 108 may also include an electrical insulator/isolator that surrounds the hot/line, neutral, and ground conductors 156, 160, and 164 and is illustrated by dashed lines. Power flows from the plug 112 to the electrical load 104 via the hot, neutral, and ground conductors 156, 160, and 164.

A protection module 168 is electrically coupled to at least the conductors 156, 160, and 164 of the cord 108. The protection module 168 detects when an arc flash condition occurs (e.g., at the load 104). When an arc flash condition occurs, the protection module 168 flows a second predetermined current (from power received from the hot conductor) through the ground conductor 164 of the cord 108. The second predetermined current is greater than the first predetermined current and may be, for example, 10 mA or another suitable current. The second predetermined current (and more specifically the current through the neutral conductor being less than the current through the hot/line conductor by at least the second predetermined current) causes the GFCI module 152 of the outlet 128 to open circuit, thus providing protection.

Arc flash conditions may generate high frequency current interruptions due to intermittent connection and disconnection when, for example, a loose or frayed electrical connection is present (e.g., in the load 104, the cord 108, or the plug 112). The interruptions are sensed by the protection module 168 by monitoring current or voltage for high frequencies or high edge rates for a predetermined period. Arc flash conditions may generally occur near peaks and not near zero crossings. Arc flash detection may be disabled near zero crossings. When no arc faults are present, voltage and current may be approximately sine waves with a frequency of 50-60 Hertz. A switch turning on the load 104 may cause high frequencies, but for shorter than the predetermined period to diagnose the presence of an arc fault.

Figure 3:
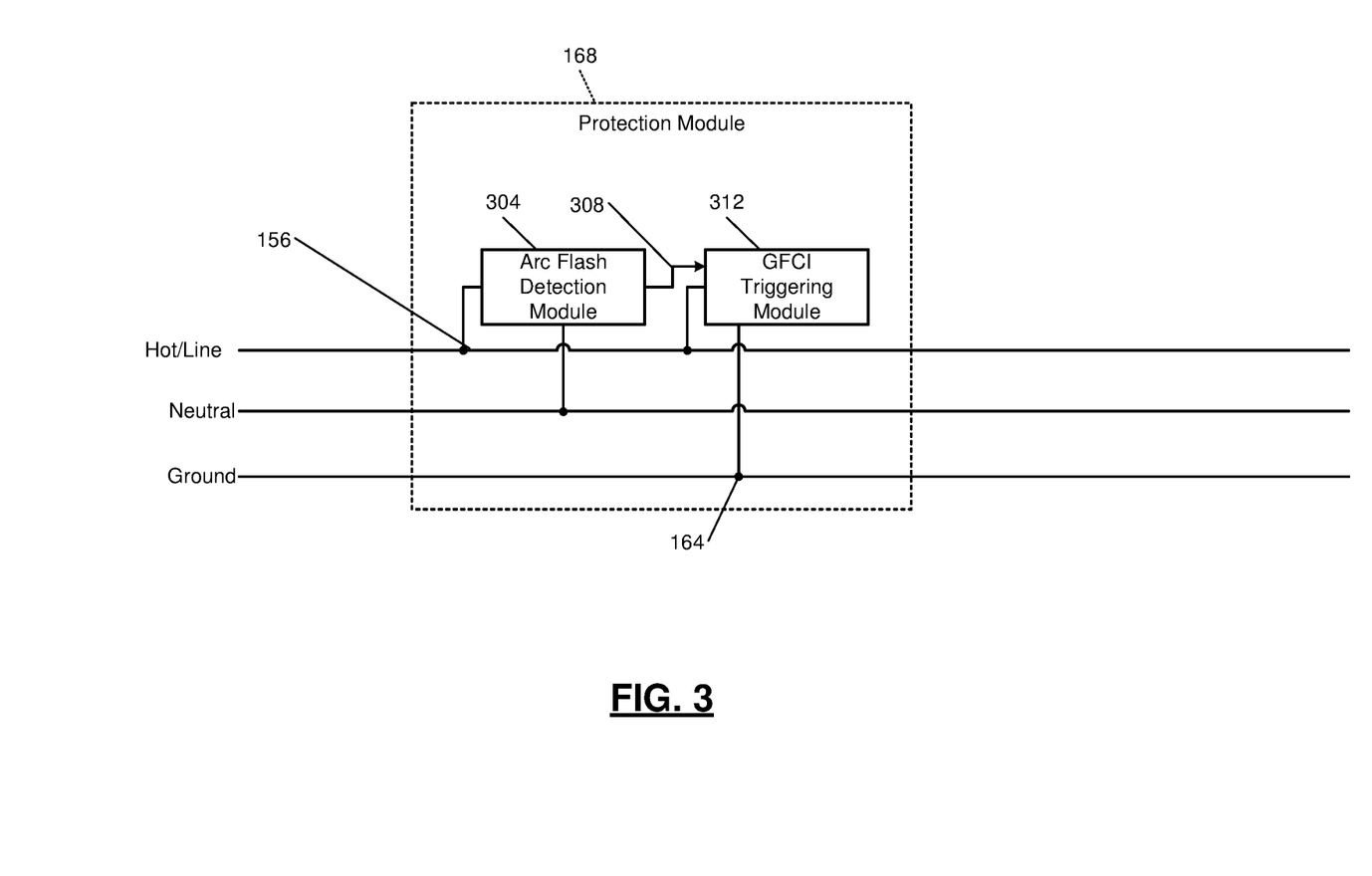
FIG. 3 is a functional block diagram of an example implementation of a protection module.

FIG. 3 is a functional block diagram of an example implementation of the protection module 168. An arc flash detection module 304 is electrically connected to the hot conductor 156 of the cord 108 and the neutral conductor 160 of the cord 108. The arc flash detection module 304 may measure current flow through the cord 108. In various implementations, the arc flash detection module 304 may instead measure a voltage between the hot and neutral conductors 156 and 160. The arc flash detection module 304 determines a frequency of the current (or voltage). The current may be directly measured or indirectly measured, such as using a Hall effect sensor, a transformer, or another suitable type of current sensor.

The arc flash detection module 304 determines whether an arc flash condition is occurring based on the frequency. In other words, the arc flash detection module 304 diagnoses the presence of an arc flash condition based on the frequency. For example, the arc flash detection module 304 may determine that an arc flash condition is occurring when the frequency is greater than a predetermined value for at least a predetermined period (e.g., continuously) or for at least a predetermined number of AC signals. Otherwise the arc flash detection module 304 may determine that no arc flash condition is present. The predetermined value, the predetermined period, and the predetermined number may be calibrated and may be set, for example, to 70 Hertz, 0.5 seconds, or 50 cycles, respectively. In various implementations, the arc flash detection module 304 may determine that an arc flash condition is occurring when the frequency is within or outside of one or more predetermined frequency ranges.

The arc flash detection module 304 generates an arc flash signal 308 that indicates whether an arc flash is present. For example, the arc flash detection module 304 may set the arc flash signal to a first state when an arc flash is present and set the arc flash signal to a second state when no arc flash is present.

When an arc flash condition is present (e.g., the arc flash signal 308 is in the first state), a GFCI triggering module 312 outputs the second predetermined current to the ground conductor 160 from the hot conductor or the neutral conductor. This creates a current imbalance between the current flows through the hot and neutral conductors. The second predetermined current is to trigger the GFCI module 152 of the outlet 128 to open and disconnect the conductors 132, 136 and 140 from the incoming AC power supply. The GFCI triggering module 312 may output the second predetermined current to the ground conductor 160 from the neutral conductor continuously for a predetermined period. In various implementations, the GFCI triggering module 312 may vary the second predetermined current. When an arc flash condition is not present, the GFCI triggering module 312 does not output current to the ground conductor 160 from the neutral conductor. In various implementations, the GFCI triggering module 312 may include a capacitor that charges via the hot and ground conductors 156 and 164. The GFCI triggering module may discharge power from the capacitor to the ground conductor 164 to generate the second predetermined current.

Figure 4:
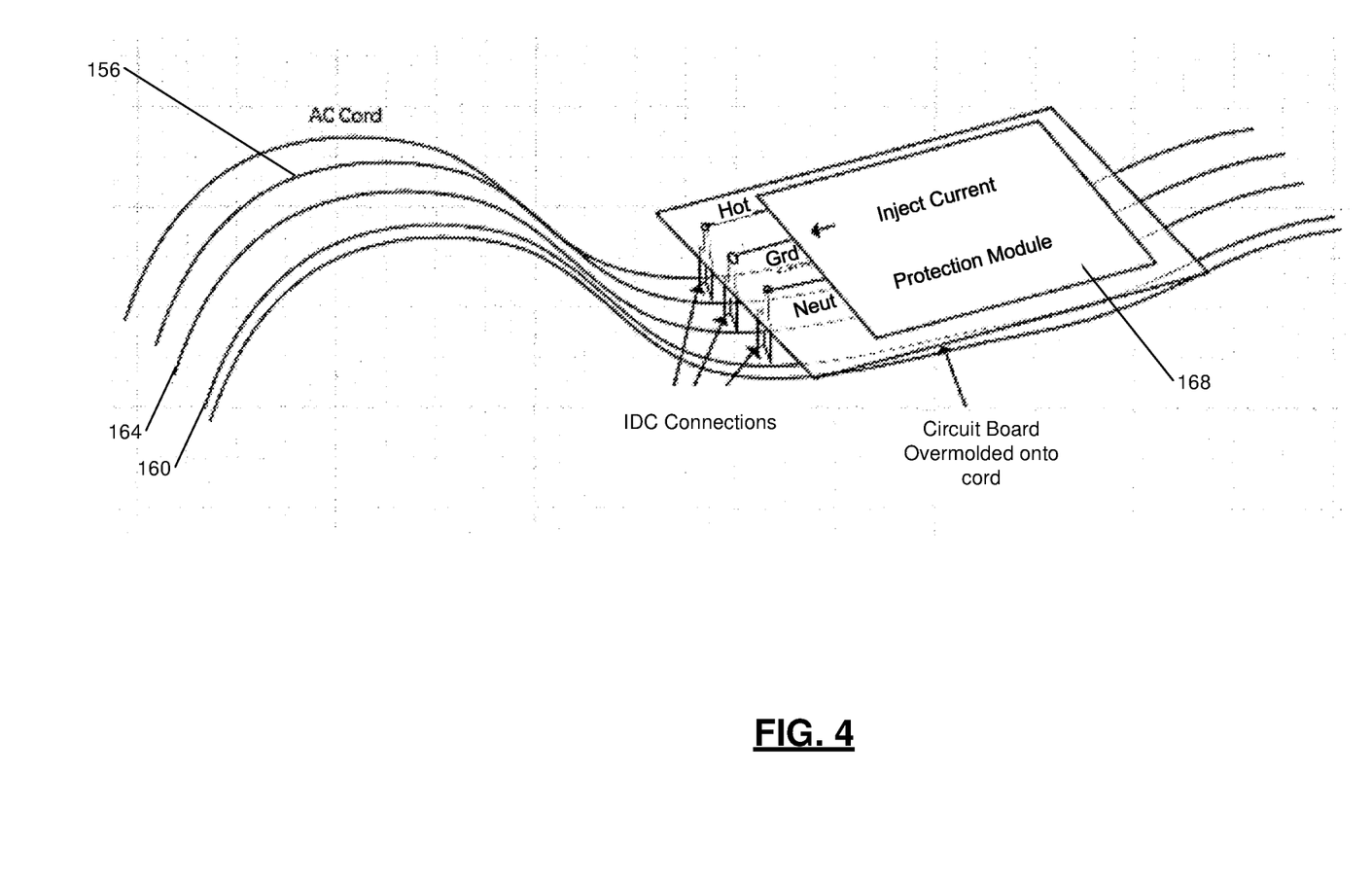
FIG. 4 is a perspective view of an example implementation of the protection module and a cord.

FIG. 4 is a perspective view of an example implementation of the protection module 168 and the cord 108. In various implementations, the protection module 168 may be implemented on a circuit board and overmolded onto the cord 108. The protection module 168 may be connected to the conductors 156, 160, and 164 of the cord 108 via insulation displacement contacts (IDCs) that extend through the outer insulation of the cord 108 and crimp onto the conductors 156, 160, and 164 within the cord 108. In various implementations, the protection module 168 may be connected inline with the conductors 156, 160, 164 of the cord 108. The over molding material may be, for example, rubber, plastic, or another suitable electrical insulator/isolator material. A moisture sealant may also be used to protect the connections of the protection module 168 to the conductors 156, 160, and 164 to from moisture.

Once the GFCI module 152 is reset and the connection between the conductors 132, 136, and 140 with the incoming AC power source is reestablished, the protection module 168 will again trigger the GFCI module 152 to disconnect the conductors 132, 136, and 150 from the incoming AC power source if the arc fault condition is still present. This will continue until the arc fault condition is remedied.

Figure 5:
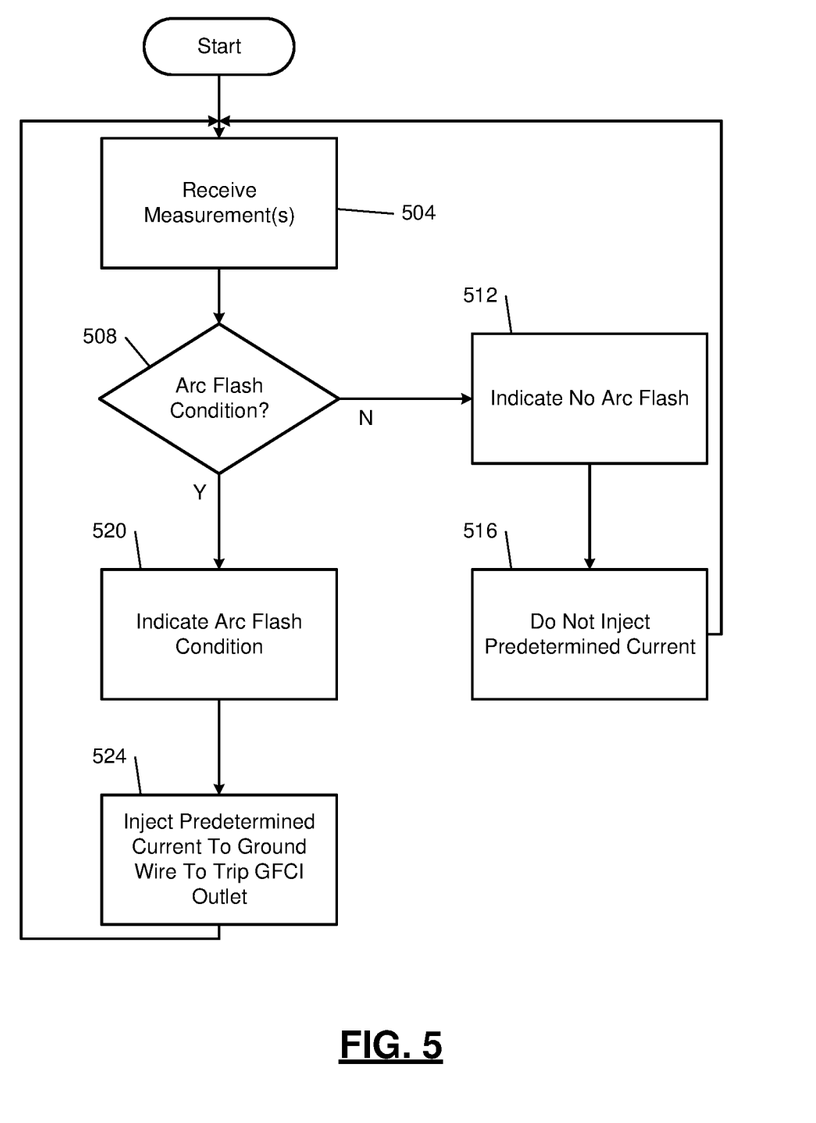
FIG. 5 is a flowchart depicting an example method of detecting and remediating arc flash conditions.

FIG. 5 is a flowchart depicting an example method of detecting and remediating arc flash conditions. The example operates and repeats while the cord 108 is receiving power. Control begins with 504 where the arc flash detection module 304 receives one or more measurements (voltage or current) from the cord 108.

At 508, the arc flash detection module 304 determines whether an arc flash condition is present as discussed above. If 508 is false, control continues with 512 and 516. If 508 is true, control continues with 520 and 524. At 512, the arc flash detection module 304 determines and indicates that no arc flash condition is present. The arc flash detection module 304 may indicate that no arc flash condition is present by setting the arc flash signal 308 to the second state. At 516, based on no arc flash being present, the GFCI triggering module 312 does not output the second predetermined current to the ground conductor 164 of the cord 108.

At 520, the arc flash detection module 304 determines and indicates that an arc flash condition is present. The arc flash detection module 304 may indicate that an arc flash condition is present by setting the arc flash signal 308 to the first state. At 524, based on the arc flash being present, the GFCI triggering module 312 outputs the second predetermined current to the ground conductor 164 of the cord 108. In response to the second predetermined current on the ground conductor 164, the GFCI module 152 of the outlet 128 open circuits the outlet 128. Control returns to 504 after 516 or 524.

While the example of a single-phase system is illustrated, the present application is also applicable to three-phase GFCI outlets and three-phase loads. In the example of three-phase applications, three power wires may be considered hot. As such, power wires may generally refer to hot or neutral power wires. In three-phase examples, the arc flash detection module 304 may monitor all three power wires since an arc fault may occur on any set of two or more power wires. Three phase systems may have a neutral wire that may be grounded in a breaker box or the neutral wire may be omitted. In this example, the GFCI module 152 may inject current from one of the three phases to the ground conductor to generate a current imbalance.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An arc flash protection system comprising:
an arc flash detection module electrically connected directly to a cord coupled to an electrical load and electrically connected to a ground fault circuit interrupt (GFCI) outlet, the arc flash detection module configured to:
measure at least one of voltage and current of the cord; and
based on the at least one of the voltage and the current of the cord, determine and indicate whether an arc flash condition is present; and
a GFCI triggering module configured to, in response to the arc flash detection module indicating that an arc flash condition is present, output a predetermined current to a ground conductor of the cord.

2. The arc flash protection system of claim 1 wherein the arc flash detection module is configured to measure the voltage of the cord.

3. The arc flash protection system of claim 1 wherein the arc flash detection module is configured to measure the current of the cord.

4. The arc flash protection system of claim 1 further comprising insulation displacement connectors that electrically connect the arc flash detection module and the GFCI module to the ground conductor and at least one other electrical conductor of the cord.

5. The arc flash protection system of claim 1 wherein:
the electrical load is a three-phase load;
the arc flash detection module is electrically connected directly to three power wires of the cord; and
the GFCI triggering module is configured to output the predetermined current to the ground conductor of the cord.

6. The arc flash protection system of claim 1 further comprising a circuit board, wherein the arc flash detection module and the GFCI triggering module are disposed on the circuit board.

7. The arc flash protection system of claim 6 further comprising over molding material that molds the circuit board, the arc flash detection module, and the GFCI module onto the cord.

8. The arc flash protection system of claim 7 further comprising weatherproofing material.

9. The arc flash protection system of claim 1 further comprising the GFCI outlet, wherein the GFCI outlet includes a GFCI module configured to selectively electrically disconnect electrical conductors of one or more outlets of the GFCI outlet from incoming alternating current (AC) power.

10. The arc flash protection system of claim 9 wherein the GFCI module is configured to electrically disconnect the electrical conductors of the one or more outlets from the incoming AC power in response to detection of a current difference between hot and neutral conductors of at least a second predetermined current.

11. The arc flash protection system of claim 10 wherein the second predetermined current is less than the predetermined current.

12. The arc flash protection system of claim 1 wherein the arc flash detection module is configured to determine and indicate whether an arc flash condition is present based on a frequency of the at least one of the voltage and the current.

13. The arc flash protection system of claim 12 wherein the arc flash detection module is configured to determine and indicate that an arc flash condition is present when the frequency is greater than a predetermined frequency.

14. The arc flash protection system of claim 13 wherein the predetermined frequency is greater than 60 Hertz.

15. The arc flash protection system of claim 13 wherein the arc flash detection module is configured to determine and indicate that an arc flash condition is present when the frequency is greater than the predetermined frequency for greater than a predetermined period.

16. A method comprising:
measuring at least one of a voltage and current of a cord, the cord coupled to an electrical load and electrically connected to a ground fault circuit interrupt (GFCI) outlet;
based on the at least one of the voltage and the current of the cord, determining and indicating whether an arc flash condition is present; and
in response to the indication that an arc flash condition is present, outputting a predetermined current to a ground conductor of the cord.

17. The method of claim 16 further comprising measuring the voltage of the cord.

18. The method of claim 16 further comprising measuring the current of the cord.

19. The method of claim 16 further comprising determining and indicating whether an arc flash condition is present based on a frequency of the at least one of the voltage and the current.

20. The method of claim 19 further comprising determining and indicating that an arc flash condition is present when the frequency is greater than a predetermined frequency.

* * * * *